(12) United States Patent
Shan

(10) Patent No.: US 9,031,542 B2
(45) Date of Patent: May 12, 2015

(54) MOBILE TERMINAL FOR MULTI-PARTY CALL AND MULTI-PARTY CALL METHOD

(75) Inventor: Guangyu Shan, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 635 days.

(21) Appl. No.: 12/837,593

(22) Filed: Jul. 16, 2010

(65) Prior Publication Data

US 2011/0014901 A1 Jan. 20, 2011

(30) Foreign Application Priority Data

Jul. 17, 2009 (KR) ........................ 10-2009-0065274

(51) Int. Cl.
*H04M 3/56* (2006.01)
(52) U.S. Cl.
CPC ........ *H04M 3/56* (2013.01); *H04M 2203/5027* (2013.01)
(58) Field of Classification Search
CPC ...... H04M 3/56; H04M 2207/18; H04W 4/16
USPC .......................... 709/204; 455/415, 416, 567; 379/202.01, 205.01
See application file for complete search history.

(56) References Cited

U.S. PATENT DOCUMENTS

| | | | |
|---|---|---|---|
| 5,483,588 A * | 1/1996 | Eaton et al. | 379/202.01 |
| 7,085,364 B1 | 8/2006 | Ahmed et al. | 379/202.01 |
| 7,617,280 B1 * | 11/2009 | Webster et al. | 709/204 |
| 2002/0061098 A1 * | 5/2002 | Raniere et al. | 379/202.01 |
| 2004/0125933 A1 * | 7/2004 | Jun et al. | 379/202.01 |
| 2005/0101308 A1 | 5/2005 | Lee | |

FOREIGN PATENT DOCUMENTS

| | | | |
|---|---|---|---|
| CN | 1615043 A | 5/2005 | |
| CN | 1968112 A | 5/2007 | |
| EP | 0989766 | 3/2000 | ............... H04Q 7/22 |
| WO | WO 98/21871 | 5/1998 | ............... H04M 3/42 |
| WO | WO 2007/051493 | 5/2007 | ............... H04M 3/56 |

* cited by examiner

*Primary Examiner* — Ajit Patel
*Assistant Examiner* — Michael Irace
(74) *Attorney, Agent, or Firm* — Cha & Reiter, LLC.

(57) ABSTRACT

A multi-party call method provides connecting a multi-party call with a plurality of non-control terminals by a control terminal. Dual Tone Multi-Frequency (DTMF) signals are received from a part of the plurality of non-control terminals to which call termination commands are input by the control terminal, respectively. The received DTMF signals are recognized to check the part of the plurality of non-control terminals that have transmitted the DTMF signals; and the call states are displayed with the recognized part of the non-control terminals as a terminal state on a display screen.

9 Claims, 6 Drawing Sheets

FIG . 6

| MESSAGE | KEY INFORMATION | REMARKS |
|---|---|---|
| MULTI-PARTY CALL STATE INFORM | * # # * | |
| CALL TERMINATION | * # xxxxxxxx | XXXXXXX :TERMINAL IDENTIFICATION INFORMATION |

⋮

MOBILE TERMINAL FOR MULTI-PARTY CALL AND MULTI-PARTY CALL METHOD

CLAIM OF PRIORITY

This application claims the benefit of priority under 35 U.S.C. §119 from Korean Patent Application No. 10-2009-0065274, filed on Jul. 17, 2009 in the Korean Patent Office, the contents of which are hereby incorporated by reference in its entirety.

BACKGROUND OF THE INVENTION

1. Field of the Invention

The present invention relates to a mobile terminal for a multi-party call and a multi-party call method. More particularly, the present invention relates to a mobile terminal and a multi-party call method for controlling a multi-party call using a Dual Tone Multi Frequency (DTMF) signal.

2. Description of the Related Art

In recent years, with the rapidly increase in the use of portable terminals, such devices have become a necessity of modern life. Such portable terminals may provide all kinds of data transmission services and various additional services in addition to voice call service and providing a functional multimedia communication device.

With regard to a current synchronous portable terminal, for example, such as the majority of newer Code Division Multiple Access (CDMA) portable terminals, normally have a multi-party call function. A multi-party call is a call that is simultaneously conducted with a plurality of subscribers. A multi-party simultaneous call is advantageous that increases efficiency of a call and sometimes saves great of calling time.

In a CDMA network, a plurality of portable terminals conduct a multi-party call using a base station (BS), a base station controller (BSC), and a mobile switching center (MSC). A terminal controlling the multi-party call as the subject thereof is referred as to a 'control terminal', and each of the remaining terminals except for the control terminal are referred to as a 'non-control terminal'.

The control terminal sequentially performs call connection with a plurality of non-control terminals. When the call connection is completed, the control terminal conducts a multi-party call with a plurality of connected non-control terminals. However, in a current CDMA network, when a part of the plurality of non-control terminals terminates a call, the control terminal cannot display which of the non-control terminals have terminated the call. In this case, only when a control terminal's user checks the other party's voice to see whether they are still on the line, can the user determine which non-control terminals have terminated the call and which non-control terminals continue to maintain the call.

Moreover, in the current CDMA network, the control terminal cannot selectively terminate a call with only a part of all the non-control terminals conducting the multi-party call. In order to terminate the call with the only a part of all the non-control terminals, the control terminal's user should terminate of the entire multi-party call and connect again with non-control terminals wanting to continue the call.

SUMMARY OF THE INVENTION

The present invention provides a multi-party call method that allows a control terminal' user to know non-control terminals terminating a call when a part of a plurality of non-control terminals conducting a multi-party call terminates the call. The present invention provides a multi-party call method satisfying the following conditions: Namely, when a part of a plurality of non-control terminals conducting a multi-party call terminates a call, a control terminal's user can identify which non-control terminals have terminated the call. The control terminal's user can terminate a part of a plurality of non-control terminals conducting the multi-party call. As a result, convenience for users is improved.

The present invention further provides a multi-party call method that allows a control terminal's user to terminate a call with only a part of a plurality of non-control terminals upon conducting a multi-party call.

The present invention further provides a portable terminal using the multi-party call method.

In accordance with an exemplary aspect of the present invention, a multi-party call method preferably includes: connecting a multi-party call with a plurality of non-control terminals by a control terminal; receiving Dual Tone Multi-Frequency (DTMF) signals from a part of the plurality of non-control terminals to which call termination commands are input by the control terminal, respectively; recognizing the received DTMF signals to check the part of the plurality of non-control terminals that have transmitted the DTMF signals; and displaying call states with the recognized part of the non-control terminals as a terminal state on a display screen.

In accordance with another exemplary aspect of the present invention, a multi-party call method preferably includes: connecting a multi-party call with a plurality of non-control terminals by a control terminal; generating a Dual Tone Multi-Frequency (DTMF) signal based on information identifying a part of the plurality of non-control terminals and transmitting the DTMF signal to the plurality of non-control terminals when a command terminating a call with the part of the plurality of non-control terminals is input to the control terminal; receiving and recognizing the DTMF signal by the plurality of non-control terminals; and terminating a call with the control terminal by the part of non-control terminals.

In accordance with another exemplary aspect of the present invention, a control terminal for a multi-party call preferably includes: a wireless communication unit transmitting and receiving a Dual Tone Multi-Frequency (DTMF) signal; a DTMF module unit generating and recognizing the DTMF signal; a user interface unit displaying multi-party call state information; and a control unit controlling the wireless communication unit, controlling the DTMF module unit to recognize received DTMF signals and checking non-control terminals having transmitted the DTMF signals when the DTMF signals received from a part of the plurality of non-control terminals conducting a multi-party call, and controlling the user interface unit to display a call state with the checked non-control terminals as a termination state.

In accordance with another exemplary aspect of the present invention, a non-control terminal for a multi-party call preferably includes: a wireless communication unit transmitting and receiving a Dual Tone Multi-Frequency (DTMF) signal; a DTMF module unit generating the DTMF signal; a user interface unit recognizing an input of a user command; and a control unit controlling the user interface unit, controlling the DTMF module unit to generate the DTMF when an input of a command terminating a call with a control terminal is recognized, and for controlling the wireless communication unit to transmit the generated DTMF signal to the control terminal, and terminating a call with the control terminal.

In an exemplary aspect of the present invention, when a portion of a plurality of non-control terminals conducting a multi-party call terminates a call, a control terminal's user can determine the non-control terminals terminating the call. Furthermore, the control terminal's user can terminate a call with only a part of a plurality of non-control terminals conducting a multi-party call during the multi-party call.

BRIEF DESCRIPTION OF THE DRAWINGS

The exemplary objects, features and advantages of the present invention will become more apparent from the following detailed description in conjunction with the accompanying drawings, in which:

FIG. 6 is a view illustrating an example of key information according to an exemplary embodiment of the present invention.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the present invention, a Dual Tone Multi-Frequency (DTMF) represents a signal configured by frequencies allotted to keys included in a portable terminal. The DTMF signal is generated by the portable terminal and is transmitted to a base station. Two different frequencies are allotted to each of the keys included in the portable terminal. Frequency values of the keys are listed herein below in Table 1.

TABLE 1

| Key | Low frequency (Hz) | High frequency (Hz) |
| --- | --- | --- |
| 1 | 697 | 1209 |
| 2 | 697 | 1336 |
| 3 | 697 | 1477 |
| 4 | 770 | 1209 |
| 5 | 770 | 1336 |
| 6 | 770 | 1477 |
| 7 | 852 | 1209 |
| 8 | 852 | 1336 |
| 9 | 852 | 1477 |
| 0 | 941 | 1209 |
| * | 941 | 1336 |
| # | 941 | 1477 |

Implementation of the DTMF largely falls into two divisions with generation and recognition. More particularly, in DTMF the term "generation" means to generate two different frequencies correspondingly allotted to each key. For example, when key '9' is input, the portable terminal generates two sounds having a high frequency of 1477 Hz and low frequency of 852 Hz, and transmits the two sounds to a base station (BS). In addition, the term "recognition" means to separate transmitted combination signals to find which key is input. At this time, there is a need for a band pass filter capable of passing the respective frequencies. Namely, filters corresponding to the respective frequencies are provided and a specific frequency can be detected by passing the DTMF through the filters. For example, when a signal associated with button '9' is transmitted, an output signal can be detected in only the 1477 Hz filter and 852 Hz filter.

Figure 1:
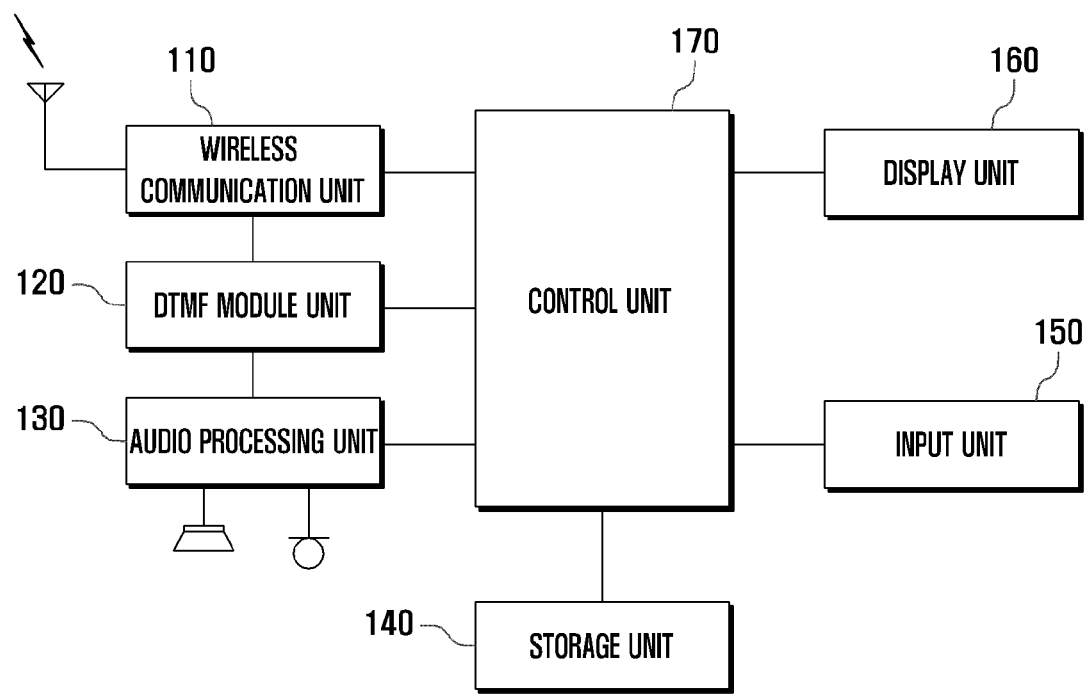
FIG. 1 is a block diagram illustrating a configuration of a portable terminal implementing a multi-party call method according to an exemplary embodiment of the present invention.

FIG. 1 is a block diagram illustrating a configuration of a portable terminal implementing a multi-party call method according to an exemplary embodiment of the present invention. The portable terminal shown in FIG. 1 is applicable to both of a control terminal and a non-control terminal.

A wireless communication unit 110 performs transmitting and receiving functions of corresponding data for wireless communication. The wireless communication unit 110 can be configured by an RF transmitter up-converting a frequency of a transmitted signal and amplifying the signal, and an RF receiver low-noise-amplifying a received signal and down-converting the signal. Further, the wireless communication unit 110 may receive data through a wireless channel and provide an output to a control unit 170, and transmit data received from the control unit 170 through the wireless channel. The wireless communication unit 110 performs wireless communication with a plurality of portable terminals through a base station (BS), a base station controller (BSC), and a mobile switching center (MSC).

According to an exemplary embodiment of the present invention, the wireless communication unit 110 transmits a DTMF signal generated by a DTMF module unit 120 to the BS.

The DTMF module unit 120 generates and transmits the DTMF signal to the wireless communication unit 110, and receives and recognizes the DTMF signal received from the wireless communication unit 110. The DTMF module unit 120 may, for example, generate and transmit the DTMF signal to an audio processing unit 130.

The audio processing unit 130 may be configured by a CODEC. The CODEC preferably includes a data CODEC processing packet data and an audio CODEC processing an audio signal such as voices. The audio processing unit 130 converts a digital audio signal into an analog audio signal using an audio CODEC, and reproduces the analog audio signal using a speaker (SPK). Further, the audio processing unit 130 converts an analog audio signal input from a microphone (MIC) into a digital audio signal using the audio CODEC. The audio processing unit 130 may receive the DTMF signal from the DTMF module unit 120 and output a sound corresponding to the DTMF signal.

A storage unit 140 provides storage of programs and data necessary for an operation of the portable terminal. The storage unit 140 may be divided into a program area and a data area. The storage unit 130 may be configured to include a volatile storage medium, a nonvolatile storage medium, or a combination thereof. The volatile storage medium includes semiconductor memories such as RAM, DRAM, or SRAM. The nonvolatile storage medium includes hard disks. The storage unit 140 according to an embodiment of the present invention stores key information for producing a DTMF signal in response to a command input by a user. The key information according to an exemplary embodiment of the present invention refers to information configured by keys (keys of 3*4 keyboard or keys of Qwerty keyboard) included in the portable terminal.

An input unit 150 receives a user's key operation signal for controlling the portable terminal and transfers it to the control unit 170. The input unit 150 can be configured by a key pad with numeric keys, character keys, and arrow keys such as a 3*4 keyboard, a Qwerty keyboard, a Dvorak keyboard, etc. In a case of a touch screen based portable terminal, the input unit 150 may be configured by a touch pad. In a case of a portable with an image sensor or an acceleration sensor, the input unit 150 can be configured by the sensor. A control terminal's user can input a command for terminating a call with a part of a plurality of non-control terminals conducting a multi-party call using the input unit 150. A non-control terminal's user can input a command for terminating a call using the input unit 150.

A display unit 160 may comprise a Liquid Crystal Display (LCD), an OLED, or any other type of thin film technology, which visibly provides menus of the portable terminal, input data, function set information and various other information to a user. For example, the display unit 160 executes functions outputting a boot screen, an idle screen, a display screen, a call screen, and other application execution screens. The display unit 160 of a control terminal according to an exemplary embodiment of the present invention displays information regarding a plurality of non-control terminals conducting a multi-party call. The information regarding non-control terminals may include a telephone number of each non-control terminal and a name of the non-control terminal stored matching with the telephone number. Further, the display unit 160 of the control terminal may display a menu screen terminating a call with a part of the plurality of non-control terminal conducting a multi-party call. The display unit 160 of the control terminal according to an exemplary embodiment of the present invention displays change information regarding non-control terminals in a multi-party call state.

When one or more (but less than all) of the non-control terminals in the multi-party call state terminate a call or a control terminal's user inputs a command terminating a call with said one or more of the non-control terminals using the input unit 150, the display unit 160 of the control terminal may display a message indicating that a call is terminated or a call with said one or more of the non-control terminals in which a termination is designated has been terminated. In this case, the display unit 160 may eliminate and display information regarding said one or more of the non-control terminals among information regarding the plurality of non-control terminals conducting a multi-party call. The display unit 160 of the non-control terminal according to an exemplary embodiment of the present invention may display a message indicating that the portable terminal is in a multi-party call state.

In an exemplary embodiment of the present invention, the input unit 150 and the display unit 160 can be configured as one structural element called a user interface (UI) unit. In a case of a touch screen based portable terminal, the input unit 150 and the display unit 160 is configured by a touch screen unit. In this case, the touch screen unit functions as a UI unit.

The control unit 170 controls overall operations of the portable terminal and signal flow between internal blocks therein. The control unit 170 of a control terminal according to an exemplary embodiment of the present invention controls the wireless communication unit 110. When the wireless communication unit 110 receives a DTMF signal from one or more of the non-control terminals connecting with a multi-party call, the control unit 170 controls a DTMF module unit 120 to recognize the DTMF signal and check a message corresponding to the DTMF signal. At this time, the control unit 170 checks a non-control terminal having transmitting the DTMF signal. The control unit 170 controls the display unit 160 to display a call state with the checked non-control terminal as a termination state. For example, the control unit 160 controls the display unit 160 may eliminate information regarding the checked non-control terminals from information regarding a plurality of non-control terminals conducting the multi-party call and display remaining information.

The control unit 170 of the control terminal according to a second exemplary embodiment of the present invention controls a display unit 160 to display information regarding a plurality of non-control terminals in a multi-party call state. The control unit 170 of the control terminal according to an exemplary embodiment of the present invention may control the display unit 160 to display a menu screen terminating a call with one or more (but may be less than all) of the plurality of non-control terminals. The control unit 170 controls the input unit 150. When the control unit 170 recognizes that a command terminating a call with said one or more of the plurality of non-control terminals is input, it controls the DTMF module unit 120 to generate a DTMF signal. Further, the control unit 170 commands the wireless communication unit 110 to transmit the generated DTMF signal to all of the non-control terminals, and controls the display unit 160 to display a call state with non-control terminals in which a call termination is designated as a termination state.

With continued reference to FIG. 1, the control unit 170 of a non-control terminal according to a first exemplary embodiment of the present invention controls the input unit 150. When the control unit 170 recognizes that a command terminating a call is input, the control unit commands the DTMF module unit 120 to generate a DTMF signal, and commands the wireless communication unit 110 to transmit the generated DTMF signal to the control terminal, and terminates a call.

The control unit 170 of a non-control terminal according to a second exemplary embodiment of the present invention controls a wireless communication unit 110 to receive a DTMF signal from a control terminal, controls a DTMF module unit 120 to recognize the received DTMF signal, checks whether or not terminal identification information corresponding to the recognized DTMF signal is identical with identification information of a non-control terminal, and terminates a call when the terminal identification information is identical with the identification information of a non-control terminal.

Figure 2:
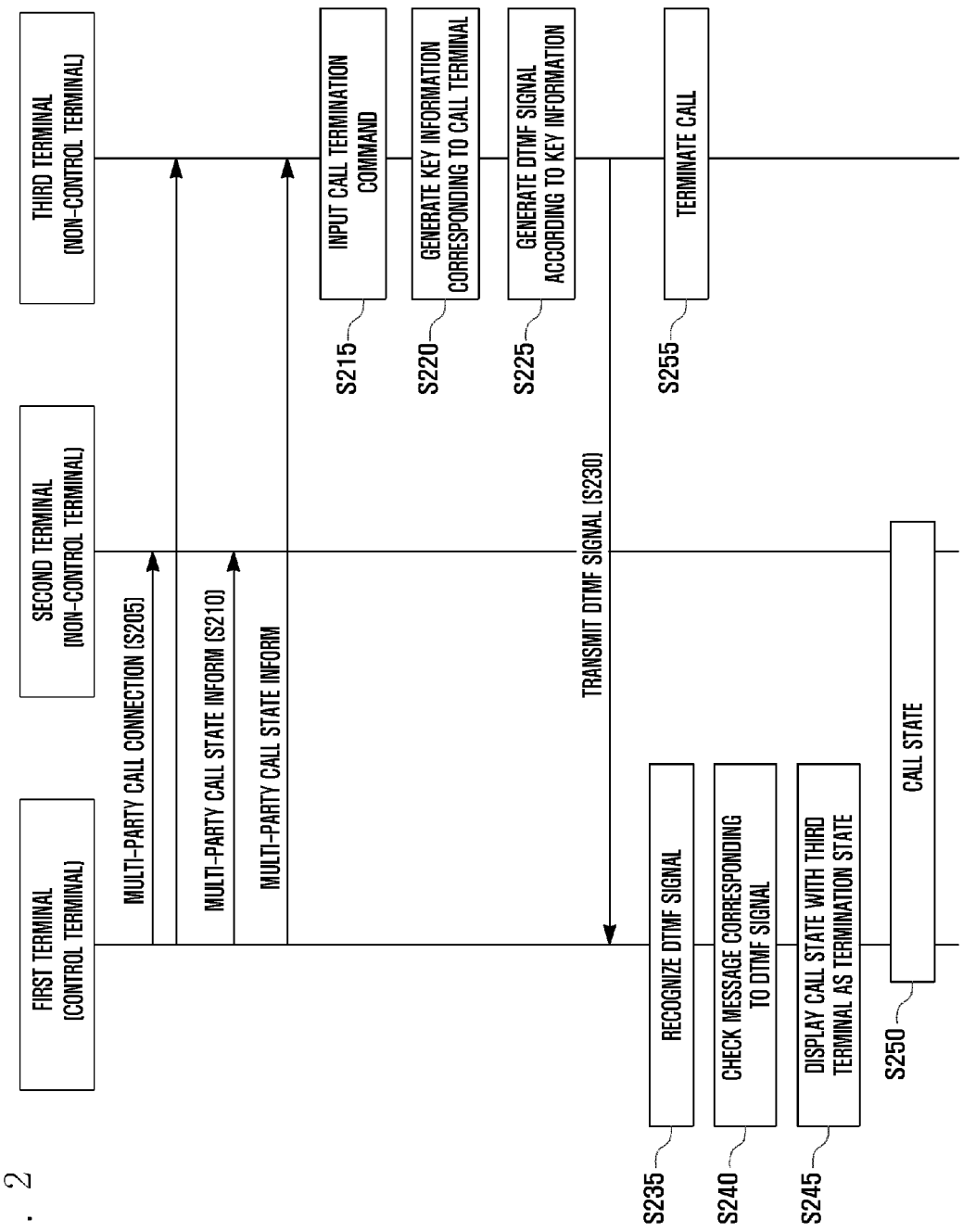
FIG. 2 is a scheme diagram illustrating a multi-party call method according to a first exemplary embodiment of the present invention.

FIG. 2 is a scheme diagram illustrating a multi-party call method according to a first exemplary embodiment of the present invention. In this particular example, a first terminal, a second terminal, and a third terminal conduct a multi-party call described by way of example in a first exemplary embodiment of the present invention. The first terminal corresponds to a control terminal. The second terminal and the third terminal correspond to non-control terminals, respectively. Meanwhile, in the first embodiment of the present invention, a case is described that the third terminal terminates a multi-party call during the multi-party call. Further, the first terminal, the second terminal, and the third terminal perform wireless communication using a wireless communication network composed of a BS, a BST, and an MSC. Hereinafter, in order to clearly describe the gist of the present invention, the wireless communication network is omitted but a multi-party call method will be described using the first terminal, the second terminal, and the third terminal.

At (S205), the first terminal (a control terminal in this case) conducts a multi-party call connection with the second terminal (a non-control terminal) and the third terminal. The first terminal may be set to initiate a multi-party call at the time of an initial call connection to conduct the multi-party call with the second terminal and the second terminal. After conducting connection with the second terminal, the first terminal may continue a one-to-one call and add the third terminal to conduct a multi-party call connection. The first terminal sequentially connects with the second terminal and the third terminal.

After conducting the multi-party call connection with the second terminal and the third terminal, then at (S210) the first terminal preferably transmits a message informing a multi-party call state to the second terminal and the third terminal. A control unit 170 of the first terminal extracts key information corresponding to a message of 'multi-party state information' from a storage unit 140 and transfers it to a DTMF module unit 120. FIG. 6 is a view illustrating an example of key information according to an exemplary embodiment of the present invention. Referring now to FIG. 6, a message of 'multi-party state information' corresponds to key information of '*##*'. A control unit 170 of the first terminal extracts the '*##*' from the storage unit 140 and transfers the extracted '*##*' to a DTMF module unit 120. The control unit 170 of the first terminal controls the DTMF module unit 120 to generate the same DTMF signal as in input of the '*##*'. As indicated in Table 1, the DTMF module unit 120 generates the DTMF signal using frequencies corresponding to '*', '#', '#', and '*'. The control unit 170 of the first terminal transfers the generated DTMF signal to the wireless communication unit 110. The wireless communication unit 110 of the first terminal (a control terminal) transmits the DTMF signal to the second terminal and the third terminal, both of which are non-control terminals. The control unit 170 of the second terminal and the third terminal controls the wireless communication unit 110 to receive the DTMF signal, and transfers the received DTMF signal to the DTMF module unit 120. The DTMF module unit 120 of the second terminal and the third terminal recognizes the DTMF signal to detect '*##*'. The control unit 170 checks that a message corresponding to the '*##*' is 'multi-party call state information'.

The control unit 170 of the second terminal and the third terminal according to an exemplary embodiment of the present invention may control a display unit 160 to display a message informing a multi-party call state. Further, the control unit 170 of the second terminal and the third terminal may change a transmission mode from a normal mode to a DTMF mode. In this case, the transmission mode can be divided into the normal mode and the DTMF mode. The normal mode is a mode that may recognize a DTMF signal but not generate the DTMF signal. The DTMF mode is a mode that may perform both of generation and recognition of the DTMF signal. In a transmission mode of the second terminal and the third terminal, a normal mode is set as a default. When the control unit 170 of the second terminal and the third terminal receives a DTMF signal from the first terminal and checks that a message corresponding to the DTMF signal is a 'multi-party call state information', it may change a transmission mode from a normal mode to a DTMF mode.

With continued reference to FIG. 2, step S210 may be omitted in accordance with an exemplary embodiment of the present invention. In this case, the second terminal and the third terminal do not need to divide a transmission into a normal mode and a DTMF mode. However, a mode for generating and receiving the DTMF signal is fundamentally set.

At (S215), the third terminal's user inputs a call termination command using an input unit 150. The input unit 150 of the third terminal produces and transmits an input signal corresponding to a user's call termination command to the control unit 170. The control unit 170 receives the input signal from the input unit 150 and recognizes that the call termination command is input. At (S220), the control unit 170 produces key information corresponding to call termination. Key information, according to an exemplary embodiment of the present invention, may be stored by messages in a storage unit 140 of the third terminal. The control unit 170 of the third terminal extracts key information corresponding to a message from the storage unit 140. The control unit 170 of the third terminal according to an exemplary embodiment of the present invention may generate key information. Referring now to FIG. 6, the control unit 170 of the third terminal generates '*#XXXXXXXX' as the key information corresponding to call termination. In this case, '*#' represents call termination, 'XXXXXXXX' represents identification information of the third terminal. For example, 'XXXXXXXX' can present eight beak digits of phone numbers in the third terminal. The control unit 170 of the third terminal combines a key indicative of call termination and identification information of the third terminal to generate key information. Next, the control unit 170 of the third terminal transmits the generated key information to the DTMF module unit 120.

At (S225), the control unit 170 of the third terminal controls the DTMF module unit 120 to generate a DTMF signal according to the generated key information. Referring again to FIG. 6, the DTMF module unit 120 of the third terminal generates the DTMF signal using a frequency corresponding to '*#XXXXXXXX'. The control unit 170 of the third terminal transmits the generated DTMF signal to the wireless communication unit 110. At (S230), the control unit 170 of the third terminal controls the wireless communication unit 110 to transmit the generated DTMF signal to the first terminal.

The control unit 170 of the first terminal controls the wireless communication unit 110 to receive the DTMF signal from a third terminal. The control unit 170 transmits the DTMF signal to a DTMF module unit 120. At (S235), the control unit 170 controls the DTMF module unit 120 to recognize the DTMF signal. Recognition of the DTMF signal is achieved using a band pass filter, and the DTMF module unit 120 detects key information constituting the DTMF signal. Referring again to FIG. 6, the DTMF module unit 120 of the first terminal recognizes the DTMF signal to detect key information of '*#XXXXXXXX'. At (S240), the control unit 170 checks a message using the detected key information. Referring to FIG. 6, the control unit 170 of the first terminal checks a message that a terminal (third terminal) corresponding to identification number of 'XXXXXXXX' terminates a call.

At (S245), the control unit 170 controls the display unit 160 to display a call state with the third terminal as a termination state. For example, the control unit 160 of the first terminal may control the display unit 160 to eliminate information about the third terminal from a display screen indicating a multi-party call state and to display remaining information. Further, the control unit 170 of the first terminal may control the display unit 160 to display a message that a call with the third terminal is terminated. At (S250), the control unit 170 of the first terminal maintains a call state with the second terminal. In this case, the first terminal and the second terminal are in a one-to-one call state (no longer a multi-party call). In an exemplary embodiment of the present invention, when a transmission mode of the second terminal is set to a DTMF mode, the control unit 170 of the second terminal may change to a one-to-one call state with the first terminal to change the transmission mode from the DTMF mode to a normal mode.

At (S255), the control unit 170 of the third terminal terminates the multi-party call. In an exemplary embodiment of the present invention, after the control unit 170 of the third terminal transmits the DTMF signal at (S230), it may terminate the call at once.

In a first exemplary embodiment of the present invention, when one or some of the non-control terminals conducting a multi-party call are terminated from the conversation, a non-control terminal generates a DTMF signal containing information identifying a non-control terminal terminating a call, such that the control terminal can identify which non-control terminal terminated the call.

Figure 3:
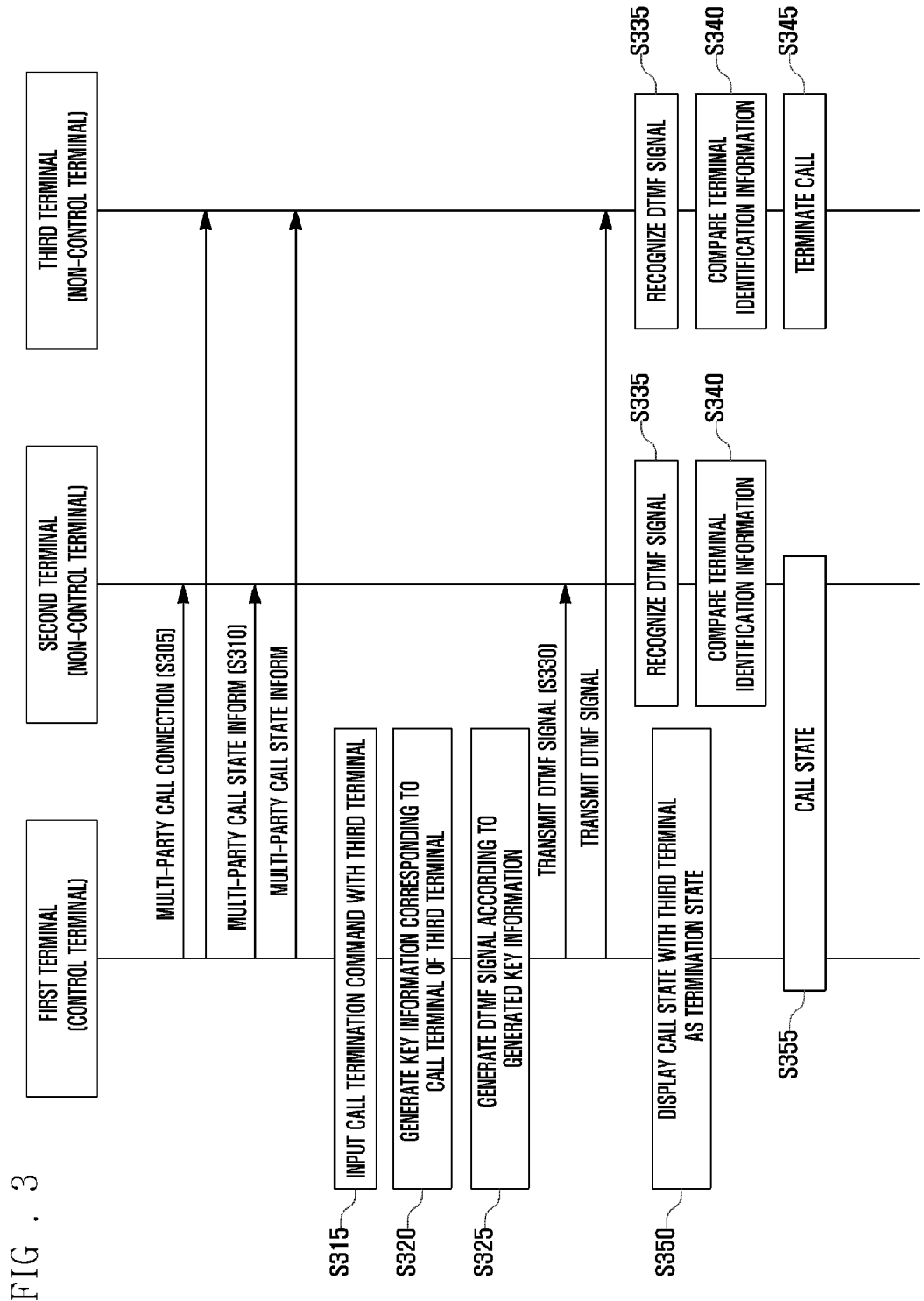
FIG. 3 is a schematic diagram illustrating a multi-party call method according to a second exemplary embodiment of the present invention.

FIG. 3 is a schematic diagram illustrating a multi-party call method according to a second exemplary embodiment of the present invention. A particular example is described in which a first terminal (control terminal), a second terminal (non-control terminal), and a third terminal (non-control terminal) conduct a multi-party call. Further, the multi-party call method will be explained by using only the first terminal, the second terminal, and the third terminal except for structural elements constituting a wireless communication network.

Referring now to FIG. 3, steps S305 and S310 are identical with steps S205 and S210 of FIG. 2, respectively. At (S315), a first terminal user inputs a command terminating a call with a third terminal using an input unit 150. A display unit 160 of the first terminal displays information about the second terminal and the third terminal in a multi-party call state. The information can contain phone numbers of the second terminal and the third terminal, and a subscriber name (user name).

In an embodiment of the present invention, when the first terminal's user selects a terminal (third terminal) for terminating a call and inputs a menu key using an input unit 150, a display unit 160 of the first terminal displays a menu list related to the selected terminal and a user selects a call termination menu therefrom, such that the first terminal's user can input a command terminating a call with the third terminal. The display unit 160 of the first terminal according to an embodiment of the present invention may display a menu capable of selecting a terminal in the multi-party call state to terminate the call. The input unit 150 of the first terminal generates and transmits an input signal corresponding to a user's call termination command, and the control unit 170 receives the input signal to recognize that a call termination command with the third terminal is input.

The control unit 170 of the first terminal generates key information corresponding to call termination with the third terminal (S320). Referring to FIG. 6, the control unit 170 of the first terminal generates key information of '*#XXXXXXXX'. Here, '*#' represents call termination and 'XXXXXXXX' represents identification information of a third terminal. For example, 'XXXXXXXX' may be eight back digits of a phone number in the third terminal. The control unit 170 of the first terminal transmits the generated key information to a DTMF module unit 120.

At (S325), the control unit 170 of the first terminal controls the DTMF module unit 120 to generate a DTMF signal according to the generated key information. The control unit 170 transfers the generated DTMF signal to the wireless communication unit 110. At (S330) the control unit 170 of the first terminal controls the wireless communication unit 110 to transmit the generated DTMF signal to a second terminal and a third terminal. Namely, the control terminal transmits the DTMF signal to all the non-control terminals in a multi-party call state.

A control unit 170 of the second terminal and the third terminal controls the wireless communication unit 110 to receive the DTMF signal provided from the first terminal. The control unit 170 of the second terminal and the third terminal transfers the DTMF signal to a DTMF module unit 120. At (S335), the control unit 170 of the second terminal and the third terminal controls the DTMF module unit 120 to recognize the DTMF signal.

Referring now to FIG. 6, the DTMF module unit 120 of the second terminal and the third terminal recognizes the DTMF signal to detect key information of '*#XXXXXXXX'. At (S340), the control unit 170 of the second terminal and the second terminal checks whether or not the 'XXXXXXXX' is identical to identification information of a corresponding terminal. The identification information of a terminal according to an embodiment of the present invention can be configured by a part or all of phone numbers in the terminal. For example, when a phone number of the third terminal is '010-8887-8765', the 'XXXXXXXX' may become '88878765'. The digit number of the 'XXXXXXXX' can vary according to a user' set.

Hereinafter, it is assumed that the 'XXXXXXXX' is identification information of the third terminal. The control unit 170 of the second terminal compares the 'XXXXXXXX' with identification information of the second terminal. The control unit 170 checks that the 'XXXXXXXX' differs from the identification information of the second terminal. At this time, the control unit 170 of the second terminal does not consider the DTMF signal received from the first terminal. The control unit 170 of the third terminal compares the 'XXXXXXXX' with identification information of the third terminal. The control unit 170 checks that the 'XXXXXXXX' is identical with the identification information of the third terminal. At this time, after the control unit 170 of the third terminal checks a message (call termination) corresponding to '*#', at (S345) the third terminal terminates a currently conducted call.

At (S350), the control unit 170 of the first terminal controls the display unit 160 to display a call state with the third terminal as a termination state. According to an exemplary embodiment of the present invention, at (S330), after the control unit 170 of the first terminal transmits a DTMF signal to the second terminal and the third terminal, it may directly control the display unit 160 to display a call state with the third terminal as a termination state. The control unit 170 maintains a call state with the second terminal.

In a second exemplary embodiment of the present invention, when a control terminal desires terminating a call with one or some of the non-control terminals conducting the multi-party call, it generates a DTMF signal with information capable of identifying the non-control terminals for call termination, and transmits the DTMF signal to all the non-control terminals. Accordingly, the non-control terminals compare identification information of the DTMF signal with identification information of a corresponding to check presence of call termination. Since the control terminal transmits the DTMF signal to the non-control terminals, and call termination is achieved by a non-control terminal, the same effect can occur as the control terminal terminates a part of the non-control terminals in the multi-party call state.

Figure 4:
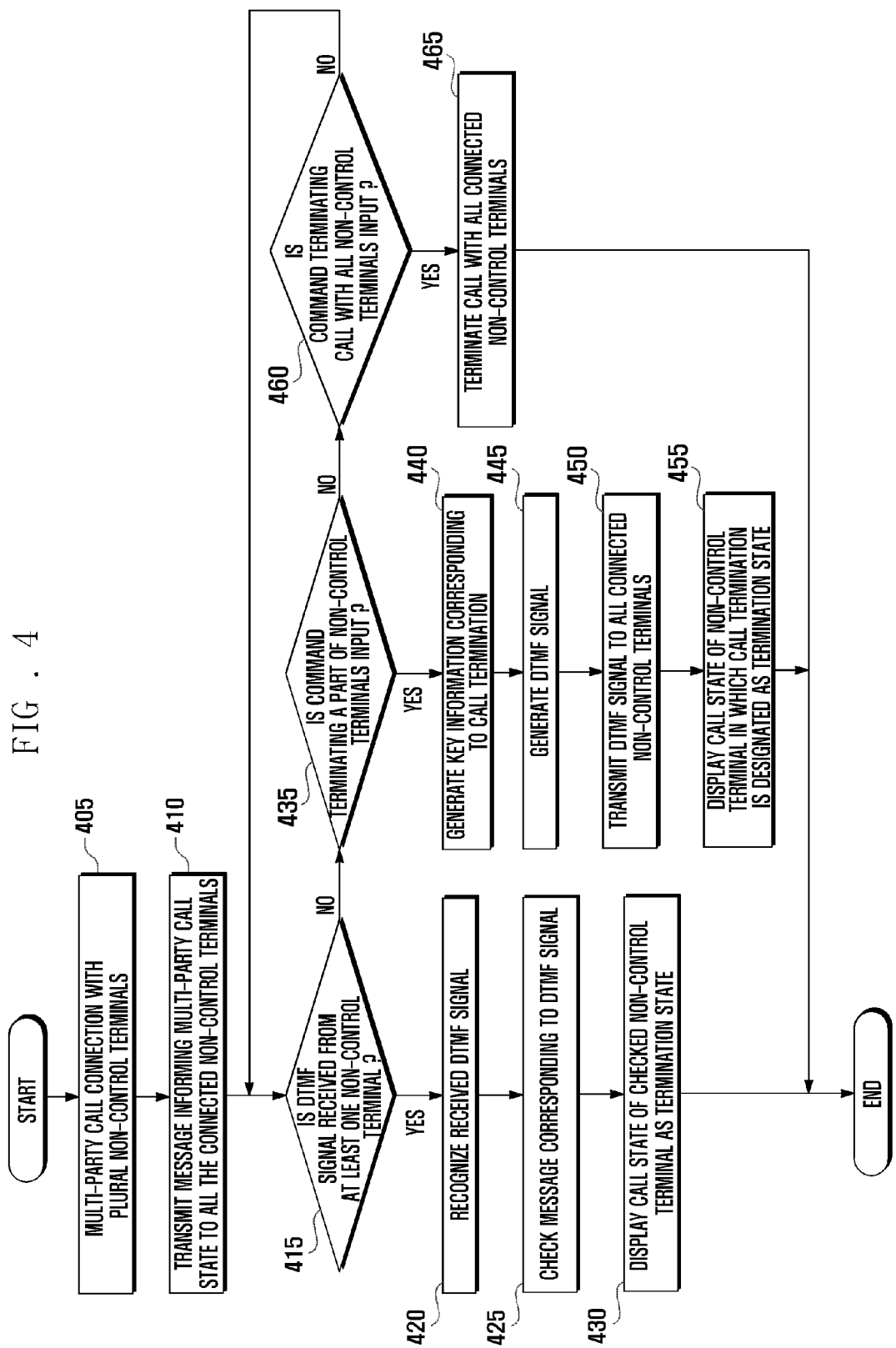
FIG. 4 is a flow chart illustrating operation of a multi-party call method conducted by a control terminal according to an exemplary embodiment of the present invention.

FIG. 4 is a flow chart illustrating a multi-party call method conducted by a control terminal according to an exemplary embodiment of the present invention.

At (S405), a control unit 170 sequentially performs multi-party call connection with a plurality of non-control terminals. At (S410) the control unit 170 controls the wireless communication unit 110 to transmit a message informing a multi-party call state to all the plurality of non-control terminals with which the multi-party call is connected. In an exemplary embodiment of the present invention, the control unit 170 may generate and transfer key information corresponding to 'multi-party call state inform' to a DTMF module unit 120, control the DTMF module unit 120 to generate the DTMF signal, and control the wireless communication unit 110 to transmit the generated DTMF signal to the plurality of non-control terminals. Step 410 may be omitted according to an embodiment of the present invention.

At (S415), the control unit 170 controls the wireless communication unit 110 and checks whether the DTMF signal is received from at least one of the non-control terminals. The wireless communication unit 110 may receive the DTMF signal from one non-control terminal or a plurality of non-control terminals. When the DTMF signal is received through the wireless communication unit 110, the control unit 170 controls the DTMF module unit 120 to recognize the DTMF signal (420). The DTMF module unit 120 detects key information generated by the non-control terminal by recognition of the DTMF signal. At (S425), the control unit 170 checks a message corresponding to the detected key information. In a description of an embodiment of the present invention, it is assumed that the key information detected by the DTMF module unit 120 contains identification information of a non-control terminal.

Referring now to FIG. 6, it is assumed that the key information detected by the DTMF module unit 120 corresponds to '*#XXXXXXXX', which is composed of '*#' indicating call termination and 'XXXXXXXX' indicating identification information of non-control terminals (for example, a series of numbers constituting phone numbers). The control unit 170 checks a non-control terminal trying to terminate a call through key information of '*#XXXXXXXX'. At (S430), the control unit 170 controls the display unit 160 to display a call state of the checked non-control terminal as a termination state.

At (S435), when the wireless communication unit 110 does not receive the DTMF signal from at least one non-control terminal in step 415, the control unit 170 controls an input unit 150 and checks whether a command terminating the call with a part of all the non-control terminals in a multi-party call state is input. In an exemplary embodiment of the present invention, a command terminating the call with one non-control terminal or a plurality of non-control terminals can be input. When a call termination command with a part of non-control terminals is input, then at (S440) the control unit 170 generates key information containing information identifying non-control terminals in which the call termination is designated.

Referring again to FIG. 6, when the information identifying non-control terminals in which the call termination is '59684256', the control unit 170 generates key information of '*#59684256'. The control unit 170 transfers the generated key information to the DTMF module unit 120. At (S445), the control unit 170 controls the DTMF module unit 120 to generate the DTMF signal according to the generated key information. At (S450), the control unit 170 transfers the generated DTMF signal to the wireless communication unit 110, and controls the wireless communication unit 110 to transmit the generated DTMF signal to all the connected non-control terminals. Next, at (S455) the control unit 170 controls the display unit 160 to change and display a call state with the non-control terminals in which call termination is designated.

As a checking result in step 435, when a command terminating a call with a part of the non-control units is not input, at (S460) the control unit 170 checks whether a command terminating a call with all the multi-party call connected non-control terminals is input. When a command terminating the call with all the non-control terminals is input, at (S465) the control unit 170 terminates the call with all the multi-party call connected non-control terminals.

Figure 5:
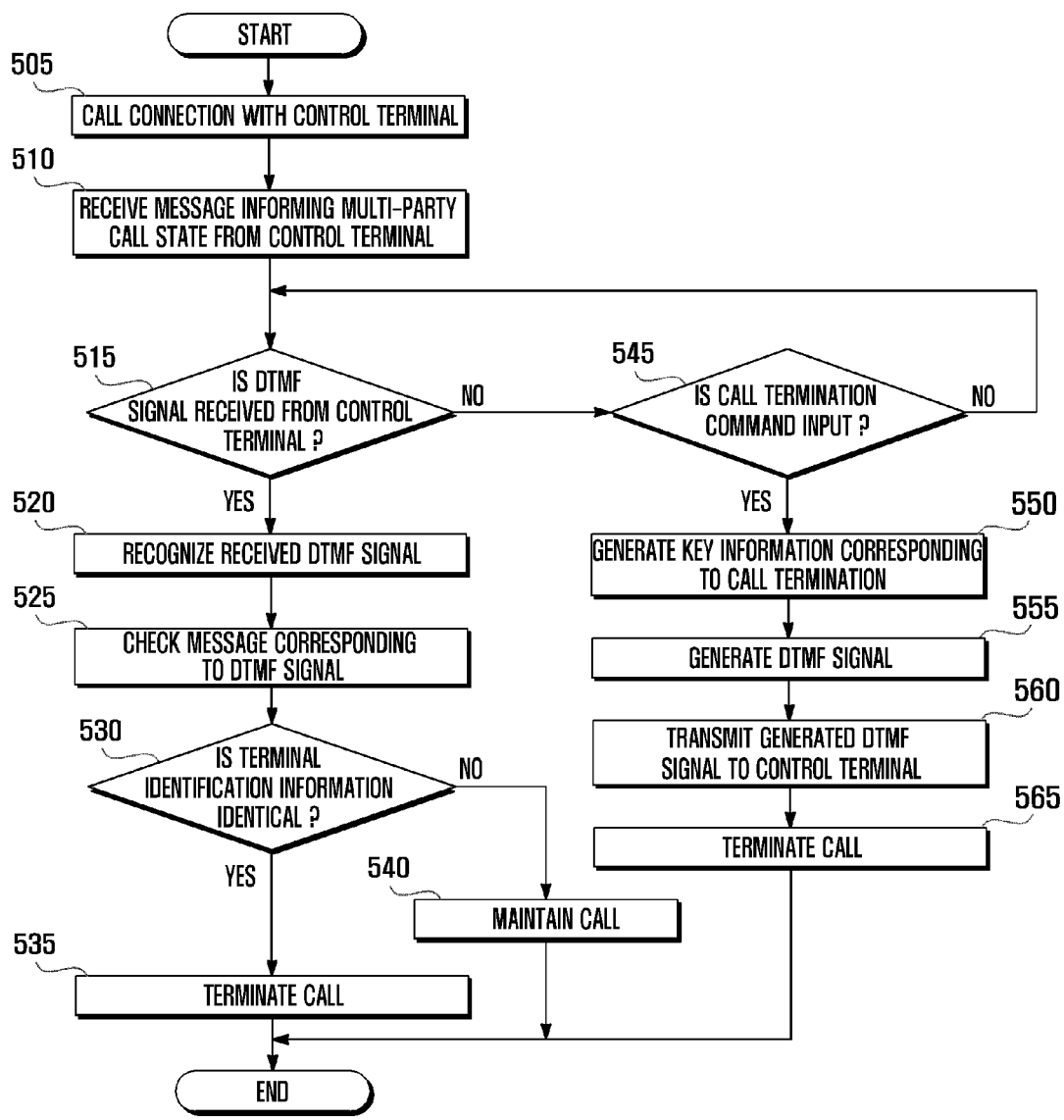
FIG. 5 is a flow chart illustrating operation of a multi-party call method conducted by a non-control terminal according to an exemplary embodiment of the present invention.

FIG. 5 is a flow chart illustrating a multi-party call method conducted by a non-control terminal according to an embodiment of the present invention.

At (S505) a control unit 170 controls a wireless communication unit 110 to perform call connection with a control terminal.

The control terminal requests call connection to the non-control terminal, and the control unit 170 of the non-control terminal controls the wireless communication unit 110 to perform call connection with the control terminal in response to the call connection request from the control terminal. Next, at (S510) the control unit 170 controls the wireless communication unit 110 to receive a message informing a multi-party call state from the control terminal.

In an exemplary embodiment of the present invention, when the wireless communication unit 110 receives a DTMF signal from the control terminal, the control unit 170 transfers the DTMF signal to the DTMF module unit 120, and the DTMF module unit 120 recognizes the DTMF signal to detect key information, the control unit 170 may check based on the detected key information that the control terminal transmits a message informing a multi-party call state. In an exemplary embodiment of the present invention, the control unit 170 may change a transmission mode from a normal mode to a DTMF mode. The normal mode is mode that may recognize the DTMF mode but does not generate a DTMF signal. The DTMF mode is a mode that may perform both of generation and recognition of the DTMF signal. Step 510 may be omitted according to an embodiment of the present invention.

At (S515) the control unit 170 controls the wireless communication unit 110 to check whether a DTMF signal is received from a control terminal.

When the DTMF signal is received, at (S520) the control unit 170 controls the DTMF module unit 120 to recognize the received DTMF signal. At (S525) the DTMF module unit 120 recognizes the DTMF signal to detect key information, and the control unit 170 checks a message received from the control terminal based on the detected key information. In an exemplary embodiment of the present invention, it is assumed that the DTMF signal transmitted by the control terminal is generated based on key information corresponding to call termination and identification information of a non-control terminal. At (S530) the control unit 170 checks whether identification information of a terminal included in the DTMF signal is identical with identification information of a terminal having received the DTMF signal.

When the identification information of a terminal included in the DTMF signal is identical with the identification information of a terminal having received the DTMF signal, at (S535) the control unit 170 terminates the call. When the identification information of a terminal included in the DTMF signal differs from the identification information of a terminal having received the DTMF signal, at (S540) the control unit 170 continues to maintain the call.

With continued reference to FIG. 5, when the wireless communication unit 110 does not receive the DTMF signal in step 515, at (S545) the control unit 170 controls the input unit 150 and checks whether a call termination command is input from a user. For example, when the user inputs a 'termination key' of the input unit 150, the control unit 170 recognizes the input as a call terminal command. At (S550) the control unit 170 generates key information corresponding to call termination. The key information corresponding to call termination according to an exemplary embodiment of the present invention contains identification information of a terminal (e.g., phone number of the terminal).

At (S555), the control unit 170 controls the DTMF module unit 120 to generate a DTMF signal based on the generated key information. At (S560) the control unit 170 controls a wireless communication unit 110 to transmit the DTMF signal to a control terminal. Next, the control unit 170 terminates the call.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A multi-party call method, comprising: connecting by a control terminal a multi-party call with a plurality of non-control terminals;
   extracting, when a Dual Tone Multi Frequency (DTMF) signal is received from a non-control terminal of the plurality of non-control terminals, a multi-party call control command and an identification of the non-control terminal from the received c-all n DTMF signals signal, the DTMF signal comprising a DTMF signal of keys corresponding to the multi-party call control command and a DTMF signal of keys corresponding to the identification of the non-control terminal
   displaying call states of the non-control terminals as a terminal status on a display screen when the multi-party call control command corresponds to a call termination command
   generating a DTMF signal corresponding to a multi-party call state; and
   transmitting the generated DTMF signal corresponding to the multi-party call state to the plurality of non-control terminals;
   wherein the DTMF signal is generated by pushing the keys corresponding to the multi-party call control command and by pushing the keys corresponding to the identification of the non-control terminal.

2. The method of claim 1, further comprising terminating a call with the non-control terminals sending a DTMF signal to the control terminal when the multi-party call control command corresponds to the call termination command.

3. The method according to claim 1, wherein the keys corresponding to the multi-party call control command comprise at least one of a "*" key and a "#" key.

4. A multi-party call method, comprising:
   connecting a multi-party call by a non-control terminal with a control terminal and at least one other non-control terminal;
   receiving an input of keys corresponding to the multi-party call control command and keys corresponding to the identification of the non-control terminal;
   generating a Dual Tone Multi-Frequency (DTMF) signal based on the received input, the DTMF signal comprising a DTMF signal of the keys corresponding to the multi-party call control command and a DTMF signal of the keys corresponding to the identification of the non-control terminal;
   transmitting the generated DTMF signal to the control terminal; and
   terminating a call with the control terminal when the multi-party call control command corresponds to a call termination command.

5. The method of claim 4, further comprising:
   receiving a DTMF signal corresponding to a multi-party call state from the control terminal; and
   displaying call states on a display screen based on the received DTMF signal.

6. The method of claim 4, wherein the keys corresponding to the multi-party call control command comprise at least one of a "*" key and a "#" key.

7. A control terminal for a multi-party call comprising: a wireless communication unit for transmitting and receiving Dual Tone Multi-Frequency (DTMF) signals; a DTMF module unit for generating and recognizing the DTMF signals; a user interface unit for displaying a multi-party call state information; and a control unit for controlling the DTMF module unit to extract a multi-party call control command and an identification of a non-control terminal of a plurality of non-control terminals from the received DTMF signal, when a DTMF signal is received from the non-control terminal of the plurality of non-control terminals through the wireless communication unit, controlling the user interface unit to display a call state of the non-control terminal as a termination state when the multi-party call control command corresponds to a call termination command, controlling the DTMF module unit to generate a DTMF signal corresponding to a multi-party call state, and controlling the wireless communication unit to translate the generated DTMF signal to the plurality of non-control terminals; wherein the DTMF signal comprises at least one of a DTMF signal of keys corresponding to the multi-party call control command and a DTMF signal of keys corresponding to the identification of the non-control terminal; wherein the DTMF signal is generated by pushing the keys corresponding to the multi-party call control command and by pushing the keys corresponding to the identification of the non-control terminal.

8. A non-control terminal for a multi-party call comprising:
   a wireless communication unit for transmitting and receiving Dual Tone Multi-Frequency (DTMF)signals;
   a DTMF module unit for generating a DTMF signal;
   a user interface unit for recognizing an input of a user command; and
   a control unit for controlling the DTMF module unit to generate the DTMF signal based on an input, when an input of keys corresponding to the multi-party control command and keys corresponding to the identification of the non-control terminal is received through the user interface unit, and controlling the wireless communication unit to transmit the generated DTMF signal to a control terminal;
   wherein the DTMF signal comprises at least one of a DTMF signal of the keys corresponding to the multi-party call control command and a DTMF signal of the keys corresponding to the identification of the non-control terminal.

9. The non-control terminal of claim 8, wherein the control unit controls the user interface unit to display call states on a display screen based on a received DTMF signal, and controls the wireless communication unit to translate the generated DTMF signal corresponding to a multi-party call state from the control terminal when the DTMF signal is received through the wireless communication unit.

* * * * *